May 5, 1925.

C. HÜCKEL 1,536,715

WEIGHING MACHINE FOR LOCOMOTIVES, RAILWAY WAGONS, AND OTHER VEHICLES

Filed Oct. 31, 1924

2 Sheets-Sheet 1

Inventor
C. Hückel,
By Marks & Clerk, Attorneys

May 5, 1925.  1,536,715

C. HÜCKEL

WEIGHING MACHINE FOR LOCOMOTIVES, RAILWAY WAGONS, AND OTHER VEHICLES

Filed Oct. 31, 1924   2 Sheets-Sheet 2

Inventor
C. Hückel,
By Marks & Clerk
Attorneys

Patented May 5, 1925.

1,536,715

UNITED STATES PATENT OFFICE.

CARL HÜCKEL, OF NEUTITSCHEIN, MORAVIA, CZECHOSLOVAKIA.

WEIGHING MACHINE FOR LOCOMOTIVES, RAILWAY WAGONS, AND OTHER VEHICLES.

Application filed October 31, 1924. Serial No. 747,089.

*To all whom it may concern:*

Be it known that I, CARL HÜCKEL, manufacturer, a citizen of the Republic of Czechoslovakia, and residing at Neutitschein, Moravia, Czechoslovakia, have invented certain new and useful Improvements in Weighing Machines for Locomotives, Railway Wagons, and Other Vehicles, of which the following is a specification.

A method is known of measuring the weight of wagons in general or the wheel pressure by arranging a dynamometer between the ends of two levers, the other ends of which rest upon one another by a weighing-machine knife edge, and bear one on a stationary support, a rail for example, and the other against the periphery of the wheel the pressure of which is to be measured. The arrangements of this kind hitherto known have the disadvantage that the point of contact of the one lever with the periphery of the wheel lies outside the actual plane of wheel pressure, that is to say, the plane passing through the tread circle of the wheel, so that the weight indicated by the dynamometer does not correspond, in consequence of the leverage arising, to the actual weight of the vehicle or the magnitude of the wheel pressure. Experiments have shown that differences in this connection between the actual and the indicated weights occur from 3 to 4. To remove this disadvantage is the object of the present invention, which consists essentially in arranging the propping points at which the one lever bears against the wheel on opposite sides of the point at which the wheel normally rests on the rail or on the ground as the case may be, by which means it is easily possible to take the pressure of the wheel from the tread circle thereon.

Figure 1:
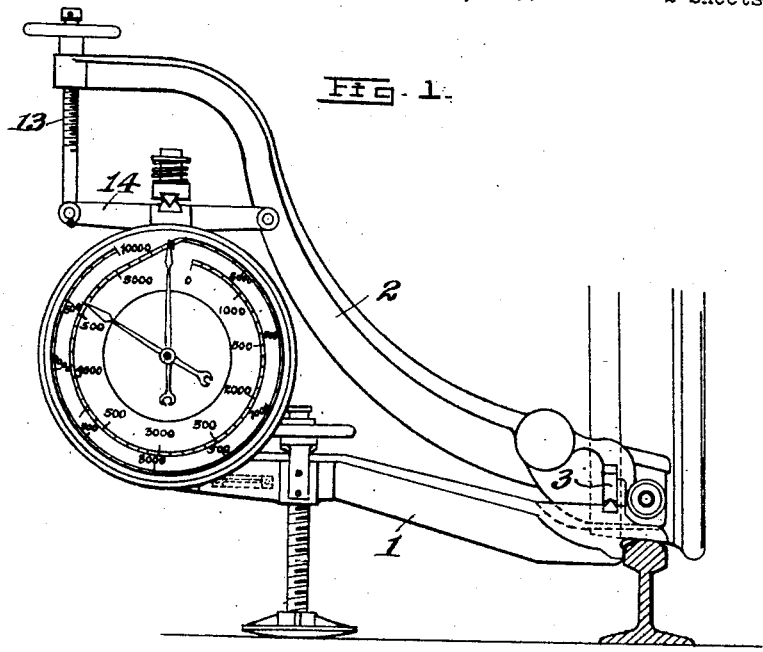
Figure 2:
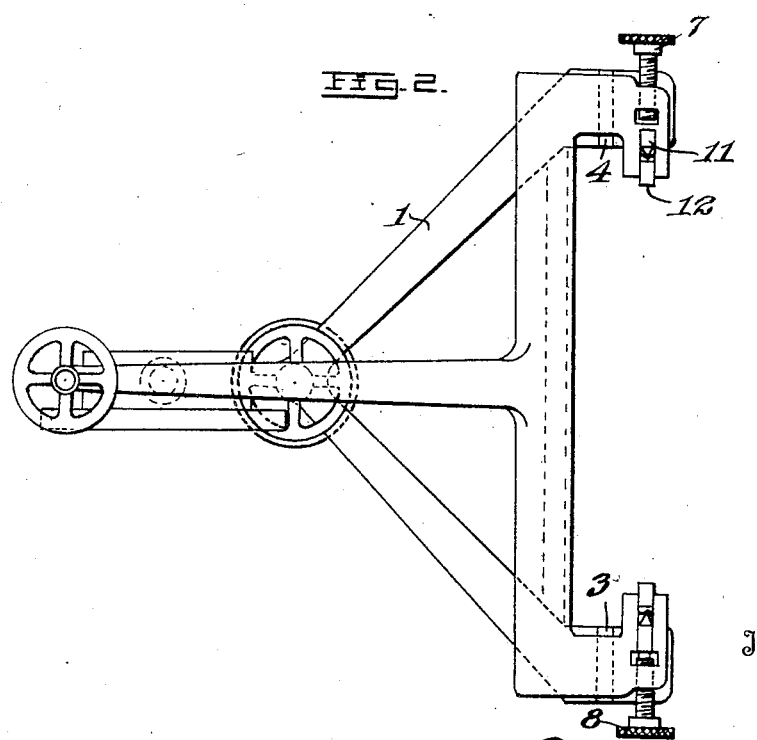
Figure 3:
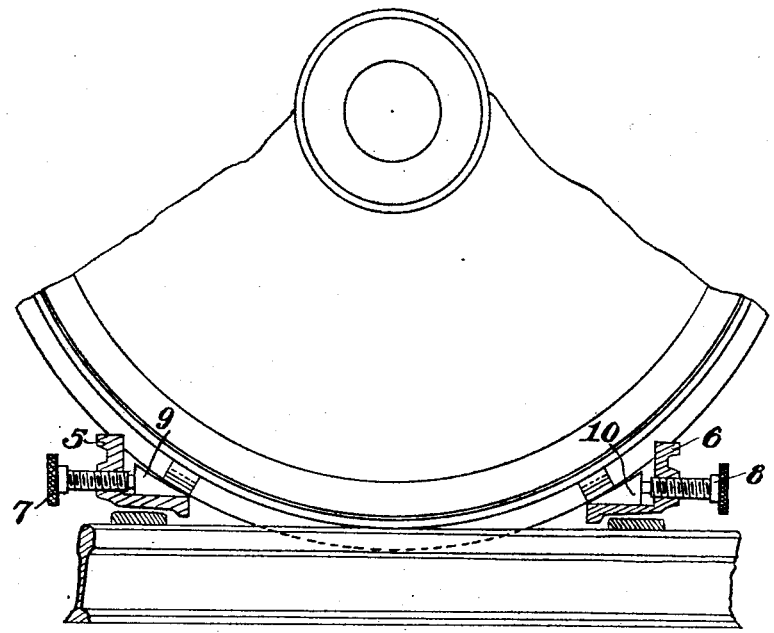
Figure 4:
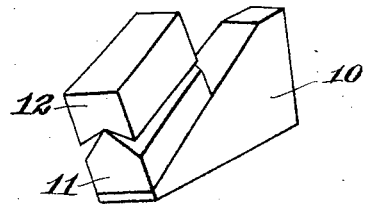

Within the ambit of this invention the most varied constructional forms are of course possible. The drawing shows one constructional example of the weighing machine, Figure 1 being an end view, Figure 2 a plan and Figure 3 a partial side elevation. Figure 4 shows a detail.

As can be seen from the drawing, the ends of the levers 1, 2, bearing respectively upon the stationary support (the rail) and upon the wheel, are forked, and the limbs of the forks bear against one another by means of the knife edges 3, 4. At the ends of the forked branches of the lever 2 are arranged pillow blocks 5 and 6, in which by means of the adjusting screws 7 and 8, wedges 9 and 10 are displaceable, on the oblique surfaces of which are located the propping members facing the periphery of the wheel.

It is clear that these propping members, by means of this arrangement, can be so adjusted as to lie exactly in the tread circle of the wheel.

It is advantageous to arrange the prop members by means of prisms in such a way (Figure 4) that the knife edge 11 is underneath and the pillow block 12 above, so that a fouling of the pillow block or an injuring of the point of support cannot occur, since an accumulation of dirt in the pillow block cannot occur at all, in consequence of its position with the concave side downwards, and on the other hand such impurities slide off the oblique faces of the knife edge.

The invention also relates to the arranging of the dynamometer itself between the outer ends of the aforementioned levers 1 and 2. The adjusting screw 13 acts according to the invention not directly upon the dynamometer but upon a lever 14 pivoted to the lever 2, in or near the middle of which the dynamometer is suspended in a suitable manner, for instance by prism suspension. By this means the advantage is obtained that the course adjusting movements can be effected by means of the adjusting screw 13, without thereby having to act directly upon the mechanism of the dynamometer. The adjustment of the needle can therefore be effected more finely than has been possible in the case of apparatus hitherto known, merely by arranging an extremely fine thread. In addition to this the dynamometer itself, owing to this arrangement is no longer directly subjected to the force exerted in adjusting the adjusting screw, by which means the entire mechanism of the dynamometer and of the indicating apparatus is to a material extent preserved from harmful stresses and remains uneffected thereby.

What I claim is:—

1. A weighing machine for locomotives, railway carriages and wagons and other vehicles having wheels normally resting upon a stationary support, comprising two levers rotatable relatively to one another, a dynamometer arranged between adjacent ends of the two levers, the end of each lever remote from the dynamometer engaging between the wheel of the vehicle and its stationary support on each side of the point at which the wheel normally rests upon said support, and means for directly adjusting the points at which the ends of the levers come into contact with the wheel and the stationary support in the plane passing through the point at which the wheel normally rests upon its stationary support.

2. A weighing machine according to claim 1, the lever ends engaging between the wheel and its stationary support being forked and comprising knife edges between the forked limbs of the levers and propping members on the forked extremities of one lever adapted to lie in the tread circle of the wheel.

3. A weighing machine as claimed in claim 1, wherein the lever ends engaging between the wheel and its stationary support are forked and wherein the means for adjusting the contact points of the levers comprise pillow blocks arranged upon the forked limbs of one lever, wedges adjustably arranged in said pillow blocks, weighing machine prisms mounted on said wedges, and inverted pillow blocks located in the tread circle of the wheel and adapted to co-act with said prisms.

4. A weighing machine according to claim 1, further comprising an adjusting screw interposed between the dynamometer and one of the levers.

5. A weighing machine for locomotives, railway carriages and wagons and other vehicles having wheels normally resting upon a stationary support, comprising two forked levers movable relatively to one another, a dynamometer arranged between the adjacent ends of the two levers, an adjusting screw interposed between the dynamometer and one of the levers, the end of each lever remote from the dynamometer engaging between the wheel of the vehicle and its stationary support on each side of the point at which the wheel normally rests upon said support, knife edges between the forked limbs of the lever, pillow blocks arranged upon the forked limbs of one of the levers, wedges adjustably arranged in said pillow blocks, weighing machine prisms mounted on said wedges, inverted pillow blocks located in the tread circle and the wheel and adapted to coact with said prisms, and adjusting screws mounted in the shaft and coacting with the wedges.

In testimony whereof I have signed my name to this specification.

CARL HÜCKEL.

Witnesses:
    ENG. ARTHUR SCHEINBURG,
    KLAR K. CHUR.